US012811164B2

(12) United States Patent
Krebs et al.

(10) Patent No.: US 12,811,164 B2
(45) Date of Patent: Nov. 24, 2026

(54) METHOD AND SET FOR PRODUCING A ZINC-MANGANESE DIOXIDE CELL, AND CELL PRODUCED USING SAID METHOD

(71) Applicant: VARTA MICROBATTERY GMBH, Ellwangen Jagst (DE)

(72) Inventors: Martin Krebs, Rosenberg (DE); Werner Fink, Rangendingen (DE)

(73) Assignee: VARTA MICROBATTERY GMBH, Ellwangen Jagst (DE)

(*) Notice: Subject to any disclaimer, the term of this patent is extended or adjusted under 35 U.S.C. 154(b) by 514 days.

(21) Appl. No.: 18/287,307

(22) PCT Filed: Apr. 21, 2022

(86) PCT No.: PCT/EP2022/060607
§ 371 (c)(1),
(2) Date: Oct. 18, 2023

(87) PCT Pub. No.: WO2022/223724
PCT Pub. Date: Oct. 27, 2022

(65) Prior Publication Data

US 2024/0204212 A1 Jun. 20, 2024

(30) Foreign Application Priority Data

Apr. 21, 2021 (EP) .................................... 21169727

(51) Int. Cl.
*H01M 6/12* (2006.01)
*H01M 4/02* (2006.01)
(Continued)

(52) U.S. Cl.
CPC ............... *H01M 6/12* (2013.01); *H01M 4/12* (2013.01); *H01M 4/50* (2013.01); *H01M 4/625* (2013.01);
(Continued)

(58) Field of Classification Search
CPC ........................................................ H01M 6/12
See application file for complete search history.

(56) References Cited

U.S. PATENT DOCUMENTS

| | | | |
|---|---|---|---|
| 4,119,770 | A | 10/1978 | Land |
| 2010/0081049 | A1 | 4/2010 | Holl |

FOREIGN PATENT DOCUMENTS

| | | | |
|---|---|---|---|
| EP | 3179538 | A1 | 6/2017 |
| EP | 2 561 564 | B1 | 5/2019 |

(Continued)

*Primary Examiner* — Stephan J Essex
(74) *Attorney, Agent, or Firm* — Leydig, Voit & Mayer, Ltd.

(57) ABSTRACT

A method of manufacturing a zinc-manganese dioxide cell includes applying a first electrical conductor to an electrically non-conductive substrate and applying a second electrical conductor to the electrically non-conductive substrate. The method further includes applying a layer-shaped negative electrode directly onto the first electrical conductor, applying a layer-shaped positive electrode directly onto the second electrical conductor, providing a layer-shaped separator, applying at least one electrolyte layer to the layer-shaped negative electrode and/or to the layer-shaped positive electrode and/or to the layer-shaped separator, and forming a stack of layers with the sequence negative electrode/separator/positive electrode. The negative electrode is formed of a paste comprising zinc powder (mercury free), electrode binder, and solvent and/or dispersant. The positive electrode is formed of a paste comprising manganese dioxide, conductive material for improving electrical conductivity, electrode binder, and solvent and/or dispersant.

17 Claims, 2 Drawing Sheets

(51) Int. Cl.

| | |
|---|---|
| ***H01M 4/12*** | (2006.01) |
| ***H01M 4/50*** | (2010.01) |
| ***H01M 4/62*** | (2006.01) |
| ***H01M 50/417*** | (2021.01) |
| ***H01M 50/44*** | (2021.01) |
| ***H01M 50/46*** | (2021.01) |
| ***H01M 50/491*** | (2021.01) |

(52) U.S. Cl.
CPC ......... *H01M 50/417* (2021.01); *H01M 50/44* (2021.01); *H01M 50/46* (2021.01); *H01M 50/491* (2021.01); *H01M 2004/021* (2013.01); *H01M 2300/0005* (2013.01)

(56) References Cited

FOREIGN PATENT DOCUMENTS

| | | | | | |
|---|---|---|---|---|---|
| GB | 2531588 | A | | 4/2016 | |
| KR | 20070006190 | A | * | 1/2007 | .............. H01M 4/50 |
| WO | WO 2006/105966 | A1 | | 10/2006 | |
| WO | WO-2011131627 | A1 | * | 10/2011 | ............ H01M 50/44 |

* cited by examiner

METHOD AND SET FOR PRODUCING A ZINC-MANGANESE DIOXIDE CELL, AND CELL PRODUCED USING SAID METHOD

CROSS REFERENCE TO RELATED APPLICATIONS

This application is a U.S. National Phase application under 35 U.S.C. § 371 of International Application No. PCT/EP2022/060607, filed on Apr. 21, 2022, and claims benefit to European Patent Application No. EP 21169727.1, filed on Apr. 21, 2021. The International Application was published in German on Oct. 27, 2022 as WO 2022/223724 under PCT Article 21(2).

FIELD

The present disclosure relates to a method of manufacturing a zinc-manganese dioxide cell and to a set for manufacturing a zinc-manganese dioxide cell. Furthermore, the present disclosure relates to a cell produced according to the method and to a cell produced with the set.

BACKGROUND

Electrochemical cells always comprise a positive and a negative electrode. When an electrochemical cell is discharged, an energy-producing chemical reaction takes place which is composed of two electrically coupled but spatially separated partial reactions. One partial reaction, which takes place at a comparatively lower redox potential, occurs at the negative electrode, and one at a comparatively higher redox potential occurs at the positive electrode. During discharge, electrons are released at the negative electrode as a result of an oxidation process, resulting in a flow of electrons—usually via an external load—to the positive electrode, from which a corresponding quantity of electrons is taken up. A reduction process thus takes place at the positive electrode. At the same time, an ion current corresponding to the electrode reaction occurs within the cell. This ionic current is ensured by an ionically conductive electrolyte. In secondary electrochemical cells, this discharge reaction is reversible, i.e. it is possible to reverse the conversion of chemical energy into electrical energy that occurred during discharge. In primary cells, on the other hand, the discharge reaction is irreversible or the cell cannot be recharged for other reasons.

The term "battery" originally meant several electrochemical cells connected in series. This is also how it is used in the context of the present application.

Electrochemical cells can be produced not only by assembling solid individual parts. In recent years cells of which at least individual functional parts, in particular the electrodes and/or required conductor tracks, are produced by printing, i.e. from a paste containing a solvent and/or suspension agent, have become increasingly important. Cells produced in this way are known, for example, from WO 2006/105966 A1.

Generally, printed electrochemical cells have a multilayer structure. In conventional design, a printed electrochemical cell usually comprises two current collector layers, two electrode layers and an electrolyte layer in a stacked arrangement. The electrolyte layer is arranged between the two electrode layers, while the current collectors form the top and bottom of the electrochemical cell, respectively. An electrochemical cell with such a structure is described, for example, in U.S. Pat. No. 4,119,770 A.

In contrast, the above-mentioned WO 2006/105966 A1 describes much flatter electrochemical cells in which the electrodes are located next to each other on a flat, electrically non-conductive substrate (coplanar arrangement). The electrodes are connected by an ion-conductive electrolyte, which may be a gel-like zinc chloride paste, for example. The electrolyte is generally reinforced and stabilized by a non-woven or mesh-like material.

Conventional printed batteries such as those described in WO 2006/105966 A1 are suitable for many applications, but they have a very limited current-carrying capacity, especially for pulsed loads. For example, mobile phone chips place too high demands on classic printed batteries in terms of their energy consumption. This also applies in particular to newer-generation mobile radio chips that transmit according to the LTE standard (LTE=Long Term Evolution). Depending on the selected radio protocol, peak currents of up to 400 mA must be available at least for short time windows.

For universal use, printed batteries must be as cheap as possible to produce. In addition, environmental compatibility and safety are important parameters for all products in mass use.

SUMMARY

In an embodiment, the present disclosure provides a method of manufacturing a zinc-manganese dioxide cell. The method includes applying a first electrical conductor to an electrically non-conductive substrate and applying a second electrical conductor to the electrically non-conductive substrate. The method further includes applying a layer-shaped negative electrode directly onto the first electrical conductor, applying a layer-shaped positive electrode directly onto the second electrical conductor, providing a layer-shaped separator, applying at least one electrolyte layer to the layer-shaped negative electrode and/or to the layer-shaped positive electrode and/or to the layer-shaped separator, and forming a stack of layers with the sequence negative electrode/separator/positive electrode. The negative electrode is prepared of a paste comprising zinc powder (mercury free), electrode binder, and solvent and/or dispersant. The positive electrode is prepared of a paste comprising manganese dioxide, conductive material for improving electrical conductivity, electrode binder, and solvent and/or dispersant. The at least one electrolyte layer is prepared of a paste comprising at least one water-soluble, chloride-containing salt, mineral particles, and solvent and/or dispersant, the proportion of the mineral particles in the paste being in a range of 5% by weight to 60% by weight.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
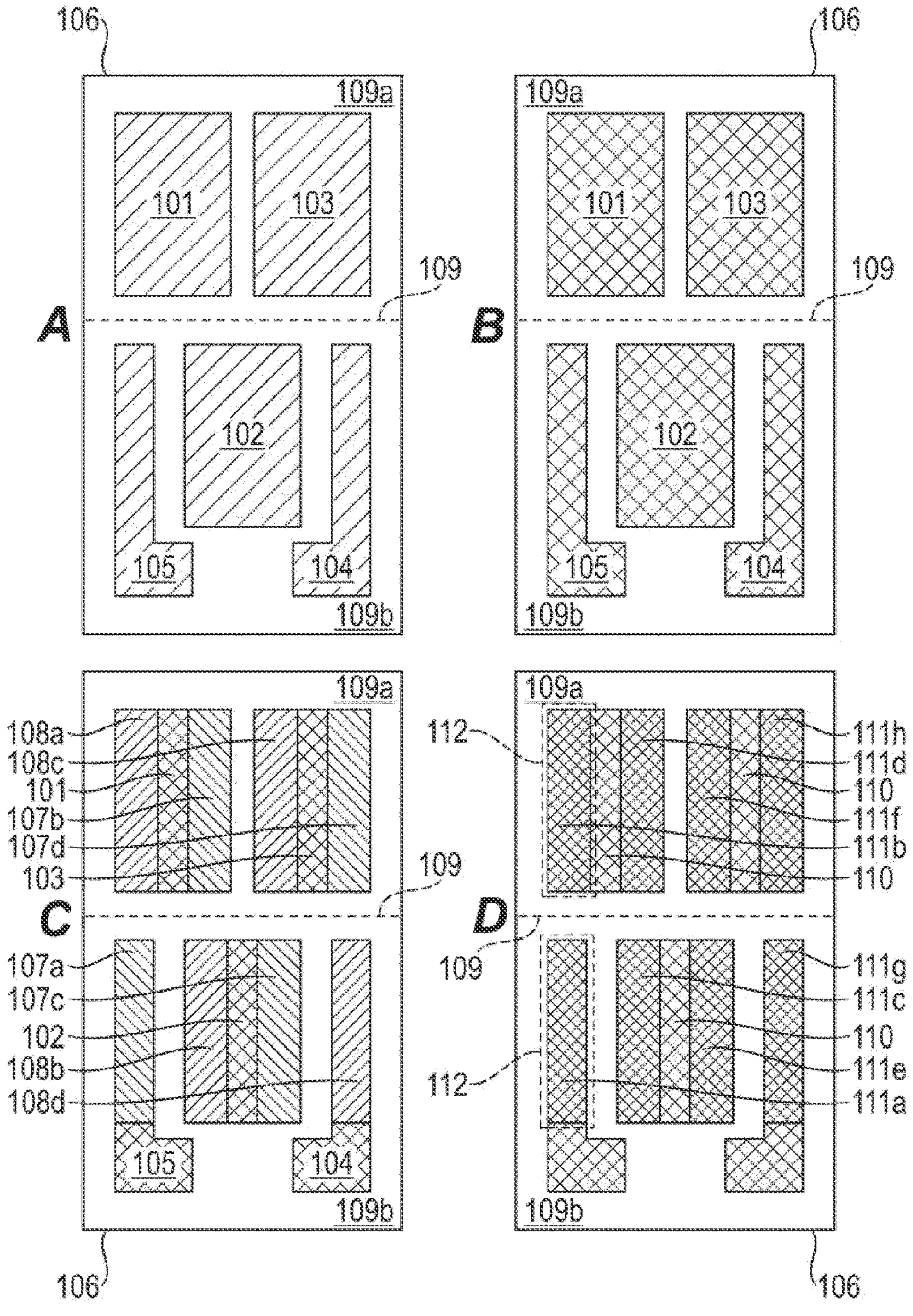
FIG. 1 illustrates a method for manufacturing a battery comprising a total of four electrically interconnected cells.

The present disclosure provides a battery that is safe, that can be produced at low cost, that is environmentally compatible, that poses no problems in particular with regard to its disposal, and that can also serve energy-intensive applications such as mobile radio chips, and in particular, mobile radio chips that operate according to the LTE standard.

According to a first aspect, the present disclosure provides a method having the immediately following steps a. to e.:

a. Applying a first electrical conductor to an electrically non-conductive substrate and a second electrical conductor to an electrically non-conductive substrate;
b. Applying a layer-shaped negative electrode directly to the first electrical conductor and a layer-shaped positive electrode directly to the second electrical conductor;
c. Provide a layer-shaped separator;
d. Applying at least one electrolyte layer to the layer-shaped negative electrode and/or to the layer-shaped positive electrode and/or to the separator; and
e. Forming a stack of layers with the sequence negative electrode/separator/positive electrode.

Pastes defined as follows are used to apply the electrodes and the at least one electrolyte layer:

f. The paste for making the negative electrode comprises the following components: zinc powder (mercury free), electrode binder, solvent and/or dispersant.
g. The paste for making the positive electrode comprises the following components: manganese dioxide, conductive material to improve electrical conductivity, electrode binder, and solvent and/or dispersant.
h. The paste for producing the at least one electrolyte layer comprises the following components: at least one water-soluble, chloride-containing salt, preferably zinc chloride and/or ammonium chloride, mineral particles, and solvent and/or dispersant.

According to the present disclosure, the proportion of the mineral particles in the paste is at least 5% by weight and at most 60% by weight. Further preferred is, that the minimum proportion of the mineral particles is at least 10 wt. %, preferably more than 10 wt. %, and the maximum proportion is at most 50 wt. %, preferably at most 40 wt. %.

The percentages given here refer to the total weight of the paste, i.e. the weight of all components of the paste including the solvent and/or the dispersant. This applies in the following with regard to all percentages in connection with mass fractions of paste components.

To transmit an LTE message, first scanning takes place. During this process, the label searches for possible frequencies for the data transmission. This process takes an average of 2 s and requires 50 mA. When the frequency is found, a so-called TX pulse is sent. Such a pulse lasts about 150 ms and requires an electrical current pulse of about 200 mA. A pulse with a length of 150 ms corresponds approximately to a frequency of 4 Hz. Accordingly, the impedance of the battery at 4 Hz is important for the transmission of such a pulse.

Cells produced according to the method described here give particularly good results in this context. The mechanism leading to the good values has not yet been conclusively clarified. However, it is suspected that the proportion of mineral particles in the paste used to produce the at least one electrolyte layer plays a role here. As will be described below, these form a boundary layer between the electrodes and the separator. The at least one water-soluble chloride-containing salt dissolved in the solvent and/or dispersant, in particular the zinc chloride and/or the ammonium chloride, then constitutes the actual electrolyte which can penetrate the separator and the boundary layer.

It is already known in principle to print electrolytes with an addition of mineral particles, for example from EP 2 561 564 B1. However, the particles have so far been used as a substitute for a separator, whereas in the present case they are used in addition to a separator. It is conceivable that the boundary layer improves the permeability of the separator for electrolyte, since the boundary layer creates a pore gradient and pores of the separator are not closed by particles of the electrode pastes. The reasons for the good impedance values are the subject of ongoing investigations.

The choice of an electrochemical system with a zinc-based negative electrode is primarily due to the required safety. Systems with zinc-based negative electrodes require an aqueous electrolyte and are therefore non-flammable. In addition, zinc is environmentally compatible and cheap.

Preferred Separator

In preferred embodiments, the separator used has at least one of the immediately following additional features a. to d:

a. The separator is a porous plastic film or a porous nonwoven;
b. The separator has a thickness in the range from 60 to 120 μm.
c. The separator has a porosity (ratio of void volume to total volume) in the range from 35-60%.
d. The separator consists of a polyolefin, for example polyethylene.

Preferably, the immediately preceding features a. to c. are implemented in combination. In further preferred embodiments, features a. to d. are realized in combination.

Paste for the Production of the at Least One Electrolyte Layer

In preferred embodiments, the paste for producing the at least one electrolyte layer is characterized by at least one of the immediately following additional features a. to i:

a. The mineral particles are selected from the group consisting of ceramic particles, salt particles that are nearly or completely insoluble in water, glass particles, and particles of natural minerals and stones such as basalt.
b. $CaCO_3$ particles are used as mineral particles.
c. The mineral particles have a d50 value in the range from 0.8 μm to 40 μm, preferably in the range from 0.8 μm to 15 μm, particularly preferably in the range from 1.0 μm to 5 μm.
d. The paste for producing the at least one electrolyte layer is essentially free of mineral particles with a particle size >80 μm, preferably >60 μm, particularly preferably >45 μm.
e. The paste for producing the at least one electrolyte layer comprises at least one additive, in particular for adjusting its viscosity, preferably in a proportion in the range from 1 to 8% by weight.
f. As an additive to adjust viscosity, the paste comprises a mineral powder with a mean particle size (d50) <500 nm, preferably <200 nm.
g. Water is used as solvent and/or dispersant.
h. The proportion of the at least one water-soluble chloride-containing salt, in particular the zinc chloride and/or the ammonium chloride, in the paste is at least 25% by weight and at most 50% by weight.

i. The paste for producing the at least one electrolyte layer comprises the following components in the following proportions.

| | |
|---|---|
| The at least one water-soluble chloride-containing salt, in particular the zinc chloride and/or the ammonium chloride | 30-40% wt. % |
| Additive for viscosity adjustment | 2-4 wt. % |
| Mineral particles | 10-30 wt. % |
| Solvent and/or dispersant | 40-55 wt. % |

wherein the proportions of the components of the paste add up to 100% by weight.

Preferably, the immediately preceding features a. and c. and d. are realized in combination. In further preferred embodiments, features e. and f. are realized in combination. Preferably, the immediately preceding features b. to i. are realized in combination.

The term "ceramic particles" is intended to comprise all particles that can be used to produce ceramic products, including silicate materials such as aluminum silicates, clay minerals, oxide materials such as silicon oxide, titanium dioxide and aluminum oxide, and non-oxide materials such as silicon carbide or silicon nitride.

In the context of the present application, the term "virtually or completely insoluble" means that there is at most a low solubility, preferably none at all, in a corresponding solvent at room temperature. The solubility of particles which can be used, in particular of the salts mentioned which are virtually or completely insoluble in water, should ideally not exceed the solubility of the preferred calcium carbonate in water at room temperature.

In principle, alkaline electrolytes, for example sodium hydroxide solution or potassium hydroxide solution, would also be well suited for a cell. However, aqueous electrolytes with a pH in the neutral region have the advantage of being less dangerous in the event of mechanical damage to the battery. Therefore, zinc chloride and ammonium chloride are particularly suitable as chloride-based conducting salts.

It is preferred that the pH of the aqueous electrolyte is in the neutral or slightly acidic region.

Preferably, the mineral particles are $CaCO_3$ particles having a d50 value in the range from 1.0 μm to 5 μm, wherein the paste for producing the at least one electrolyte layer is substantially free of mineral particles having a particle size >45 μm. The term "substantially free" in the present context is intended to mean, moreover, that less than 5%, preferably less than 1%, of the mineral particles have a particle size >45 μm.

Furthermore, it is preferred that the mineral particles are contained in the paste for producing the at least one electrolyte layer in a proportion of 10-20 wt. %.

The mineral powder with a mean particle size (d50) <500 nm, preferably <200 nm, is preferably silicon dioxide, in particular amorphous silicon dioxide. Preferably, the mineral powder is amorphous silicon dioxide or another mineral powder with a mean particle size (d50) <100 nm, further preferably <50 nm.

Binding substances such as carboxymethyl cellulose can also be used as an additive to adjust viscosity.

The term solvent and/or dispersant incidentally refers to the fact that the pastes comprise or may comprise water-soluble and non-water-soluble components. Water-soluble components are then present in dissolved form, while non-water-soluble components are present in dispersed form.

Paste for the Production of the Negative Electrode

In preferred embodiments, the paste used to produce the negative electrode is characterized by at least one of the immediately following additional features a. to h:

a. The paste for the preparation of the negative electrode comprises the zinc powder in a proportion of at least 50% by weight and preferably at least 60% by weight.
b. The zinc powder is characterized by a d50 value in the range from 20 μm to 40 μm and preferably by a particle content >45 μm of less than 5% by weight.
c. The paste for producing the negative electrode comprises at least one additive, in particular for adjusting its viscosity, preferably in a proportion in the range from 1 to 8% by weight.
d. As an additive to adjust viscosity, the paste comprises carboxymethyl cellulose.
e. The paste for making the negative electrode comprises the electrode binder in a proportion of at least 1 wt. % and preferably at most 10 wt. %.
f. The paste for producing the negative electrode comprises as electrode binder an electrode binder with elastic properties, in particular an electrode binder from the group comprising polyacrylate (PA), polyacrylic acid (PAA), polychlorotrifluoroethylene (PCTFE), polyhexafluoropropylene (PHFP), polyimides (PI), polytetrafluoroethylene (PTFE), polytrifluoroethylene (PTFE), polyvinyl alcohol (PVA), polyvinylidene difluoride (PVDF), styrene-butadiene rubber (SBR) and mixtures of the aforementioned materials.
g. Water is used as solvent and/or dispersant.
h. The paste for making the negative electrode comprises the following components in the following proportions.

| | |
|---|---|
| Zinc powder (mercury-free): | 65-79 wt. % |
| Additive for viscosity adjustment | 1-5 wt. % |
| Binder, elastic (e.g. SBR) | 5-10 wt. % |
| Solvent and/or dispersant | 15-20 wt. % |

wherein the proportions of the components of the paste add up to 100% by weight.

Preferably, the immediately preceding features a. to c. and e. to g. are realized in combination. In further preferred embodiments, features c. and d. are realized in combination. Preferably, the immediately preceding features a. to h. are realized in combination.

Preferably, the electrode binder in the negative electrode is SBR.

As a substitute for the preferably used carboxymethyl cellulose, the mineral powder with the mean particle size (d50) <500 nm, preferably <200 nm, described above in connection with the electrolyte paste could also be used as an additive for adjusting the viscosity of the paste for the negative electrode, in particular the amorphous silicon dioxide described.

Paste for the Preparation of the Positive Electrode

In preferred embodiments, the paste used to produce the positive electrode is characterized by at least one of the immediately following additional features a. to j:

a. The paste for the preparation of the positive electrode comprises the manganese dioxide in a proportion of at least 50 wt % and preferably at least 60 wt %.
b. The manganese dioxide is present in particulate form and is characterized by a d50 value in the range from 20 μm and 50 μm and preferably by a proportion of particles >55 μm of less than 5% by weight.

c. The paste for producing the positive electrode comprises at least one additive, in particular for adjusting its viscosity, preferably in a proportion in the range from 1 to 10% by weight.

d. As an additive to adjust viscosity, the paste comprises carboxymethyl cellulose.

e. The paste for the preparation of the positive electrode comprises the electrode binder in a proportion of at least 5 wt. % and preferably of at most 15 wt. %.

f. The paste for producing the positive electrode comprises as electrode binder an electrode binder with elastic properties, in particular an electrode binder from the group comprising polyacrylate (PA), polyacrylic acid (PAA), polychlorotrifluoroethylene (PCTFE), polyhexafluoropropylene (PHFP), polyimides (PI), polytetrafluoroethylene (PTFE), polytrifluoroethylene (PTrFE), polyvinyl alcohol (PVA), polyvinylidene difluoride (PVDF), styrene-butadiene rubber (SBR) and mixtures of the aforementioned materials.

g. The paste for making the positive electrode comprises the conductive material in an amount of 3 wt % to 10 wt %.

h. The positive electrode fabrication paste comprises, as a conductive material, at least one conductive material selected from the group consisting of activated carbon, activated carbon fiber, carbide-derived carbon, carbon aerogel, graphite, graphene, and carbon nanotubes (CNTs).

i. Water is used as solvent and/or dispersant.

j. The paste for making the positive electrode comprises the following components in the following proportions.

| | |
|---|---|
| Manganese dioxide | 50-70 wt. % |
| Conductive material (e.g. graphite, carbon black) | 3-30 wt. % |
| Additive for viscosity adjustment | 2-8 wt. % |
| Binder, elastic (e.g. SBR) | 8-15 wt. % |
| Solvent and/or dispersant | 20-30% by weight |

wherein the proportions of the components of the paste add up to 100% by weight.

Preferably, the immediately preceding features a. to c. and e. to g. are realized in combination. In further preferred embodiments, features g. and h. are realized in combination. Preferably, the immediately preceding features a. to j. are realized in combination.

The elastic electrode binder has the function to fix the metal oxide particles contained in the positive electrode relative to each other and at the same time give the positive electrodes a certain flexibility. However, the proportion of the elastic electrode binder should not exceed the maximum proportion mentioned above, as otherwise there is a risk that the metal oxide particles will no longer be in contact with each other, at least in part. To prevent this, the conductive material is also added.

A high proportion of the metal oxide in the positive electrode increases the capacity of the cell. For the current-carrying capacity, however, the proportion of the conductive material is of greater importance than the total proportion of the metal oxide.

Preferably, the electrode binder in the negative electrode is SBR.

The conductive material is contained in the paste for producing the negative electrode, preferably in a proportion of 5-8% by weight.

As a substitute for the preferably used carboxymethyl cellulose, the mineral powder with the mean particle size (d50) <500 nm, preferably <200 nm, described above in connection with the electrolyte paste could also be used as an additive for adjusting the viscosity in the case of the paste for the positive electrode, in particular the amorphous silicon dioxide described.

Process Variants

In a first preferred embodiment, the method is characterized by the immediately following steps a. to d.:

a. A first layer of the electrolyte paste is applied to either the negative electrode or the positive electrode, in particular printed, especially preferably with a thickness of 30 to 70 μm.

b. The separator is applied to the first layer of electrolyte paste.

c. A second layer of the electrolyte paste is applied to the separator, in particular printed, especially preferably with a thickness of 30 to 70 μm.

d. The stack of layers is formed wherein the electrode not chosen in step a. is contacted with the second layer of electrolyte paste.

In a second, preferred embodiment, the method is characterized by the following steps a. to c.:

a. A layer of the electrolyte paste is applied to each of the negative electrode and the positive electrode, in particular by printing, preferably with a thickness of 30 to 70 μm.

b. The separator is applied to one of the layers of electrolyte paste, wherein one side of the separator is contacted with the layer of electrolyte paste.

c. The stack of layers is formed, wherein the other side of the separator is contacted with the other of the layers of electrolyte paste.

In stacks of layers produced in this way, one of the layers of electrolyte paste is always arranged between the electrodes and the separators. Or, in other words, the separators of stacks of layers produced in this way comprise a boundary layer of mineral particles on both sides.

In preferred embodiments, the method is characterized by at least one of the immediately following additional features a. to f.:

a. The electrodes and the at least one electrolyte layer are formed by a printing process, in particular by a screen printing process.

b. The negative electrode is formed with an average thickness in the range from 30 μm to 150 μm.

c. The positive electrode is formed with an average thickness in the range from 13 μm to 350 μm.

d. The at least one electrolyte layer is formed with an average thickness in the range from 10 to 100 μm, preferably from 30 to 70 μm.

e. The at least one electrolyte layer is applied to the negative and/or the positive electrode while it is still at least wet ("wet-on-wet application").

f. The separator is placed on one of the electrolyte layers formed while it is still at least wet.

Preferably, the immediately preceding features a. to d. are realized in combination. In further preferred embodiments, features e. and f. are realized in combination. Preferably, the immediately preceding features a. to f. are realized in combination.

It is therefore preferred that the pastes are printed. To avoid problems during printing, in preferred embodiments the printing pastes all contain particulate components with particle sizes of 50 μm or less.

As described above, the electrical conductors are preferably coated with the electrically conductive layer of carbon before the electrodes are applied to protect the conductors from direct contact with the electrolyte. The layer of carbon can also be printed on.

The electrolyte paste is preferably used in combination with a microporous polyolefin film (e.g. PE) with a thickness in the range from 60 to 120 μm and a porosity of 35-60%. Preferably, according to the above first or second preferred embodiment, layers of the electrolyte paste are formed on the electrodes and/or the separator, in particular with a thickness in the specified ranges, preferably each with a thickness of about 50 μm. The anode is preferably printed as a layer with a thickness of 30 μm to 150 μm, in particular with a thickness of 70 μm. The positive electrode is preferably printed as a layer with a thickness of 180 to 350 μm, in particular with a thickness of 280 μm.

As already mentioned, stacks of layers with the sequence negative electrode/separator/positive electrode are formed in a method according to the present disclosure. This can preferably be done by printing the electrodes of a cell next to each other, i.e. in a coplanar arrangement, on the same electrically non-conductive substrate and folding the substrate over or folding it in such a way that the electrodes and the associated separator are superimposed. After folding over, the substrate encloses the resulting stack of layers from at least three sides. A closed housing can be formed by welding and/or bonding the remaining sides.

The substrate can be of almost any design. Ideally, the surface should have no electrically conductive properties so that short circuits or leakage currents can be ruled out if the conductors of the cell are printed directly on the substrate. For example, the substrate can be a plastic-based label. For example, a foil made of a polyolefin or polyethylene terephthalate, which has an adhesive surface on one side with which it can be fixed to a product, would be suitable. The battery's electrical conductors and its other functional parts can be applied to the other side.

Electrical Conductors

The electrical conductors can be, for example, metallic structures formed by means of deposition from a solution, by means of deposition from the gas phase (for example, by a PVD method such as sputtering), or by a printing process. It is also possible to form the conductors from a closed metal layer by an etching process in which the metal layer is removed in unmasked regions.

In preferred embodiments, the method is characterized by the following additional feature a:

a. The electrical conductors are conductive paths made of metal particles, for example silver particles or silver alloy particles.

Such conductive paths can be easily produced using a printing process. Printable conductive pastes with silver particles for producing the electrical conductors are prior art and freely available in the trade.

In preferred embodiments, the method has the immediately following features below:

a. The electrical conductors comprise an electrically conductive metal layer.
b. The electrical conductors comprise, at least in some areas, an electrically conductive layer of carbon, which is arranged between the metal layer and the electrodes and which makes direct contact of the metal layer with a liquid electrolyte difficult or even prevents it.

The electrically conductive layer of carbon serves to protect the electrical conductors. In particular, if the conductors comprise silver particles, there is a risk that silver will dissolve in the electrolyte, resulting in weakening or even destruction of conductive paths. The carbon layer can protect the conductors made of silver from direct contact with the electrolyte.

Preferably, the electrically conductive layer of carbon is applied with a thickness in the range from 5 μm to 30 μm, in particular in the range from 10 μm to 20 μm.

In some preferred embodiments, the carbon layer is subjected to a heat treatment after application. This can elevate its impermeability.

Paste Set

The set is suitable for use in the method of manufacturing a zinc-manganese dioxide cell described above. It comprises the following components:

a. Paste for making a negative electrode comprising the following components:
Zinc powder (mercury free)
Electrode binder
Solvent and/or dispersant
and
b. Paste for making a positive electrode comprising the following components:
Manganese dioxide
Conductive material to improve electrical conductivity
Electrode binder
Solvent and/or dispersant
and
c. Paste for preparing an electrolyte layer comprising the following components:
At least one water-soluble chloride-containing salt, preferably zinc chloride and/or ammonium chloride
Mineral particles
Solvent and/or dispersant With regard to preferred properties of the three pastes, reference is made to the above explanations in connection with the method according to the present disclosure, in order to avoid repetition.

Preferably, the set comprises as a further component a separator for the zinc-manganese dioxide cell to be produced. With regard to preferred properties of the separator, reference is likewise made to the above explanations in connection with the method according to the present disclosure.

Zinc-Manganese Dioxide Cell and Zinc-Manganese Dioxide Battery

The cell according to the present disclosure is preferably used to supply pulse current applications with an electrical current of ≥400 mA at peak. It can therefore supply electrical energy to mobile radio chips operating according to the LTE standard, among others. In principle, however, it is also suitable for other applications.

The zinc-manganese dioxide cell can be produced by the method described above. It has the immediately following features a. to f.:

a. It comprises a first electrical conductor on an electrically non-conductive substrate and a second electrical conductor on an electrically non-conductive substrate;
b. it comprises a layer-shaped negative electrode directly on the first electrical conductor and a layer-shaped positive electrode directly on the second electrical conductor;
c. it comprises a layer-shaped separator;

wherein d. the electrodes and the separator are in the form of a stack of layers with the sequence negative electrode/separator/positive electrode, in which the negative electrode and the separator as well as the positive electrode and the separator are each connected to one another via an interface;

wherein e. the electrodes and the separator are impregnated with a preferably aqueous chloride solution, in particular with a preferably aqueous zinc chloride solution and/or a preferably aqueous ammonium chloride solution and wherein f. the interfaces between the electrodes and the separator are characterized by mineral particles which form a boundary layer there which is permeable to the electrolyte.

Since the boundary layer helps to electrically isolate the positive electrode and the negative electrode from each other due to its content of mineral filler particles, it can also be regarded as a component of the separator.

In preferred embodiments, the layer-shaped separator of the zinc-manganese dioxide cell comprises two such boundary layers, namely one on each of its sides.

Preferably, the zinc-manganese dioxide cell is characterized by at least one of the following features a. and b.:

a. The negative electrode of the cell comprises the following components in the following proportions.

| | |
|---|---|
| Zinc powder (mercury-free): | 81 to 93 wt. % |
| Additive for viscosity adjustment | 1 to 7 wt. % |
| Electrode binder | 6 to 13 wt. % |

b. The positive electrode of the cell comprises the following components in the following proportions.

| | |
|---|---|
| Manganese dioxide | 62-82 wt. % |
| Conductive material | 5-35 wt. % |
| Additive for viscosity adjustment | 2-10 wt. % |
| Electrode binder | 6-13 wt. % |

The immediately preceding features a. and b. are preferably realized in combination.

With regard to preferred properties of the listed components of the cell, i.e., for example, the electrical conductors or the mineral particles forming the boundary layer, reference is made to the above explanations in connection with the method according to the present disclosure in order to avoid repetition.

It is preferred that the cell is characterized by at least one of the immediately following additional features a. to c.:

a. The electrodes are rectangular or in the form of strips.

b. The electrodes have a length in the range from 1 cm to 25, preferably from 5 cm to 20 cm, and a width in the range from 0.5 to 10 cm, preferably from 1 cm to 5 cm.

c. The electrical conductors on the electrically non-conductive substrate have a thickness in the range from 2 μm to 250 μm, preferably from 2 μm to 100 μm, more preferably from 2 μm to 25 μm, further preferably from 5 μm to 10 μm.

Preferably, the immediately preceding features a. to c. are realized in combination with each other.

The positive and negative electrodes of the cell each have a preferred thickness in the range from 10 μm to 250 μm. The positive electrode is often somewhat thicker than the negative electrode, since the latter has a higher energy density in many cases. Thus, in some applications, it may be preferred to form the negative electrode as a layer with a thickness of 30 μm to 150 μm and the positive electrode as a layer with a thickness of 180 to 350 μm. By adjusting the thicknesses, the capacitances of the positive and negative electrodes can be balanced. In this regard, it is preferred that the positive electrode be oversized relative to the negative electrode.

The present disclosure also comprises batteries comprising two or more of the zinc-manganese dioxide cells. Preferably, the batteries comprise two, three or four series-connected zinc-manganese dioxide cells.

The cell and the battery are preferably characterized by at least one of the immediately following features a. and b.:

a. It comprises a housing enclosing the electrodes of the cell or battery, wherein a first and a second substrate are part of the housing.

b. The first and second substrates are foils or components of a foil.

Again, the immediately preceding features a. and b. are preferably realized in combination with each other.

It is preferred that the battery, including the housing, has a maximum thickness in the range of a few millimeters, preferably in the range of 0.5 mm to 5 mm, more preferably in the range from 1 mm to 3 mm. Its other dimensions depend on the number of electrically interconnected individual cells and their dimensions. For example, a battery with four serially connected individual cells may have a length of 5 to 20 cm and a width of 4 to 18 cm.

Preferably, the cell or the battery can be arranged or produced on a plastic-based label, in particular a self-adhesive label made of plastic. For example, the first or second substrate may be a foil having an adhesive layer on one of its sides. The label may be adhered to any product or package. If necessary, electronic applications such as a mobile phone chip can also be arranged on the label, which are supplied with electrical energy by the cell or the battery. For this application in particular, it is necessary for the electrodes to have a high degree of flexibility, which can be ensured by the proportion of the elastic electrode binder.

As stated above, in a preferred embodiment, the electrodes and the at least one electrolyte layer of the cell are formed by a printing process, in particular by a screen printing process. In some preferred embodiments, the cell is thus a printed cell.

In this context, a printed cell is to be understood as a cell in which at least the electrodes and the electrolyte layers, and optionally also the electrical conductors, are formed by printing the described printing pastes onto a substrate, in particular by means of a screen printing process. Preferably, the electrodes and the electrical conductors are printed.

Further features of the invention and advantages resulting from the invention will be apparent from the following examples of embodiments and the drawings, with the aid of which the invention will be explained. The embodiment described below serves merely to explain and provide a better understanding of the invention and is not to be understood as limiting in any way.

With reference to FIG. 1, both the production and the structure of a preferred embodiment of a battery 100 with four individual cells electrically connected in series can be explained. The method of manufacturing comprises the following steps:

(1) A current conductor structure is printed by screen printing on a PET film 106 with a thickness of 200 μm, which serves as a carrier. The PET film 106 is divided by the line 109 into two regions 109*a* and 109*b*, of which the region 109*a* serves as the first substrate and the region 109*b* serves as the second substrate. The electrical conductor structure comprises the first electrical conductor 101, the second electrical conductor 102, the third electrical conductor 103, the fourth electrical conductor 104, and the fifth electrical conductor 105, where the first and third conductors 101 and 103 are printed on the first substrate 109*a*. The conductors 102, 104 and 105 are printed on the second substrate 109*b*. The printing paste used here is a commercially available silver conductive paste. In the region of the electrical conductors 101-105, the PET foil 106 is coated with the paste over the entire surface in each case, so that the conductors each form a continuous electrically conductive surface. All electrical conductors are preferably formed as layers with a thickness in the range from 10 μm μm to 100 μm.

The result of this step is shown in FIG. 1A, wherein it should be noted that all layers shown in the drawing are arranged parallel to the drawing plane. This applies analogously to carbon, electrode and electrolyte layers deposited on the conductors.

(2) In a further step, the current conductor structure is covered with a thin layer of carbon particles. The layer of carbon particles is preferably formed with a thickness of 12 μm. The printing paste used here is a typical carbon paste of the type used to form electrically conductive layers and interconnections in electronics. The result of this step is shown in FIG. 1B.

In order to optimize the coverage of the current-conducting structure by the layer of carbon particles, it may be preferable to subject the formed layer to a heat treatment. The temperature that can be applied primarily depends on the thermal stability of the PET foil and must be selected accordingly.

(3) Then, the negative electrodes 107*a*, 107*b*, 107*c* and 107*d* and the positive electrodes 108*a*, 108*b*, 108*c* and 108*d* are printed on the current conductor structure. For this purpose, the first electrical conductor 101 is overprinted in areas with a zinc paste to form the negative electrode 107*b*, and is overprinted in areas with a manganese oxide paste to form the positive electrode 108*a*. The second electrical conductor 102 is overprinted with the zinc paste in some areas to form the negative electrode 107*c*, and with the manganese oxide paste in some areas to form the positive electrode 108*b*. The third electrical conductor 103 is overprinted with the zinc paste in some areas to form the negative electrode 107*d* and with the manganese oxide paste in some areas to form the positive electrode 108*c*. The fourth electrical conductor 104 is overprinted with the manganese oxide paste in areas to form the positive electrode 108*d*. And the fifth electrical conductor 105 is overprinted with the zinc paste in areas to form the negative electrode 107*a*. The pastes have the following compositions:

| | |
|---|---|
| Zinc paste: | |
| Zinc particles | 70 wt. % |
| CMC | 2 wt. % |
| SBR | 6 wt. % |
| Solvent and/or dispersant (water) | 22 wt. % |
| Manganese oxide paste: | |
| Manganese oxide | 60 wt. % |
| Graphite | 6 wt. % |
| Zinc chloride | 2 wt. % |

-continued

| | |
|---|---|
| CMC | 2 wt. % |
| SBR | 5 wt. % |
| Solvent and/or dispersant (water) | 25 wt. % |

The result of this step is shown in FIG. 1C.

The negative electrodes 107*a*-107*d* and the positive electrodes 108*a*-108*d* are each formed as rectangular strips with a length of 11 cm and a width of 2 cm. The negative electrodes 107*a*-107*d* are preferably formed here as layers with a thickness of 70 μm. The positive electrodes 108*a*-108*d* are preferably formed as layers with a thickness of 280 μm. More than one printing process may be required to form the positive electrodes 108*a*-108*d*.

Two of the electrodes are electrically connected via each of the first conductor 101, the second conductor 102, and the third conductor 103. The conductor 101 connects the positive electrode 108*a* to the negative electrode 107*b*, the conductor 102 connects the positive electrode 108*b* to the negative electrode 107*c*, and the conductor 103 connects the positive electrode 108*c* to the negative electrode 107*d*. These electrical connections are the basis for the desired serial connection of the four individual cells.

The conductors 101, 102, and 103, each of which electrically connects two electrodes, each form an electrically conductive area on the surface of the respective substrate 109*a* and 109*b* that is larger than the area occupied by the electrically connected electrodes 108*a* and 107*b*, 108*b* and 107*c*, and 108*c* and 107*d* on the surface. In one aspect, the electrically conductive areas each comprise a region covered by the electrodes. Second, a gap 110 is formed between each of the electrically connected electrodes to separate the electrodes from each other. The electrically conductive surfaces also extend across this gap 110, with the result that the cross-section of the conductor in the gap between the electrodes does not decrease.

All this already has a positive effect on the impedance values of the battery 100. The large-area contacting of the electrodes and in particular also the connection via the gap 110 ensures optimum electrical connection of the electrodes and minimizes electrical resistances.

Also, the fourth and fifth conductors 104 and 105, which are in electrical contact only with the electrodes 107*a* and 108*d*, form an electrically conductive area on the surface of the respective substrate that is larger than the area occupied by the respective electrically contacted electrode on the surface. In one aspect, the electrically conductive areas each comprise a region covered by the electrodes. On the other hand, the electrically conductive surfaces each comprise a region not covered by electrode material. These regions may serve as terminals of the battery 100 to tap the added voltage of its four serially connected individual cells.

(5) In a further subsequent step, the negative electrodes 107*a*-107*d* and the positive electrodes 108*a*-108*d* are printed with a zinc chloride paste. The electrolyte paste layers 111*a*-111*h* are formed, each having a thickness of approximately 50 μm, for example.

The result of this step is shown in FIG. 1D.

Preferably, an electrolyte paste with the following composition is used in this step:

| | |
|---|---|
| Zinc chloride | 35 wt. % |
| Floating agent (silicon dioxide) | 3 wt. % |

-continued

| | |
|---|---|
| Mineral, water-insoluble particles ($CaCO_3$) | 15 wt. % |
| Solvent and/or dispersant (water) | 47 wt. % |

The actuator and the water-insoluble particles have an electrically insulating effect.

It is advantageous if, before the paste is printed around the individual electrodes, a sealing frame 112 is formed, for example by means of an adhesive compound, which encloses the electrodes. A commercially available solder resist, for example, can serve as the starting material for forming the sealing frame 112. Two sealing frames 112 enclosing the electrodes 107*a* and 108*a* are shown by way of example. If the process is carried out appropriately, it is expedient to enclose all electrodes with sealing frames.

(6) Then, the electrolyte paste layers 111*a*-111*h* are covered with a plurality of separators, wherein this is preferably done immediately after printing the electrolyte paste layers so that the electrolyte paste layers do not dry out. Then the PET foil 106 is folded along the line 109 and folded over, so that the negative electrode 107*a* forms a first stack of layers with one of the separators and with the positive electrode 108*a*, the negative electrode 107*b* forms a second stack of layers with one of the separators and with the positive electrode 108*b*, the negative electrode 107*c* forms a third stack of layers with one of the separators and with the positive electrode 108*c*, and the negative electrode 107*d* forms a fourth stack of layers with one of the separators and with the positive electrode 108*d*.

By folding over and a final welding and/or bonding, a closed housing can be formed in which the stacks of layers are arranged.

Figure 2:
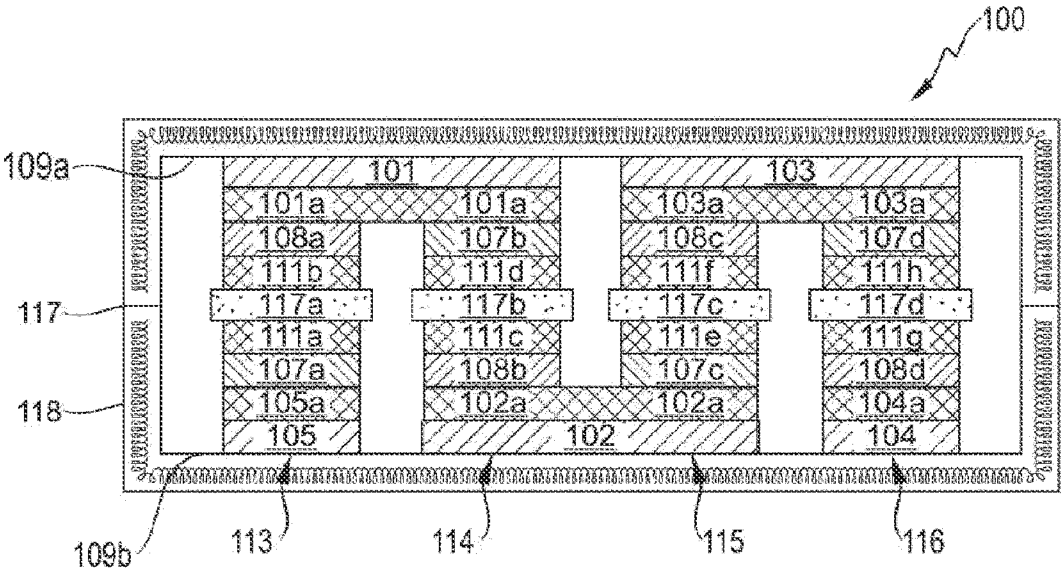
FIG. 2 illustrates a cross-section of the battery formed according to the method illustrated in FIG. 1.

The result of this step is shown in FIG. 2.

Microporous polyolefin films with a thickness in the range from 60-120 μm and a porosity (ratio of void volume to total volume) of 35-60% are used as separators for this purpose.

The battery 100 shown in cross-section in FIG. 2 comprises four individual cells 113, 114, 115 and 116, each having the form of a stack of layers. The battery shown can be produced according to the method illustrated in FIG. 1, wherein a total of four separators 117*a*-117*d* formed as a layer are used to form the individual cells.

In addition to the separators 117*a*-117*d*, the stacks of layers 113-116 each comprise one of the negative electrodes 107*a*-107*d* and one of the positive electrodes 108*a*-108*d*.

In detail:

The stack of layers 113 comprises electrical conductors 101 and 105, which comprise layers 101*a* and 105*a* of carbon particles that protect them from contact with the electrolyte. Positive electrode 108*a* is deposited directly on layer 101*a*, and negative electrode 107*a* is deposited directly on layer 105*a*. Between electrodes 107*a* and 108*a* is separator 117*a*, which is framed by electrolyte paste layers 111*a* and 111*b*. Since the electrolyte layers 111*a* and 111*b* help to electrically isolate the positive electrode 108*a* and the negative electrode 107*a* from each other by their content of electrically non-conductive mineral particles, they can be regarded as components of the separator 117*a*. In any case, the mineral particles form a boundary layer between the electrodes and the separators, which is, however, permeable to the zinc chloride dissolved in water.

The stack of layers 114 comprises electrical conductors 101 and 102, which comprise layers 101*a* and 102*a* of carbon particles that protect them from contact with the electrolyte. Positive electrode 108*b* is deposited directly on layer 102*a*, and negative electrode 107*b* is deposited directly on layer 101*a*. Between electrodes 107*b* and 108*b* is separator 117*b*, which is framed by electrolyte layers 111*c* and 111*d*. Since the electrolyte layers 111*c* and 111*d* help to electrically isolate the positive electrode 108*b* and the negative electrode 107*b* from each other due to their content of electrically non-conductive mineral components, they can be regarded as components of the separator 117*b*. In any case, the mineral particles form a boundary layer between the electrodes and the separators, which is, however, permeable to the zinc chloride dissolved in water.

The stack of layers 115 comprises electrical conductors 102 and 103, which comprise layers 102*a* and 103*a* of carbon particles that protect them from contact with the electrolyte. Positive electrode 108*c* is deposited directly on layer 103*a*, and negative electrode 107*c* is deposited directly on layer 102*a*. Between electrodes 107*c* and 108*c* is separator 117*c*, which is framed by electrolyte layers 111*e* and 111*f*. Since the electrolyte layers 111*e* and 111*f* help to electrically isolate the positive electrode 108*c* and the negative electrode 107*c* from each other due to their content of electrically non-conductive mineral components, they can be regarded as components of the separator 117*c*. In any case, the mineral particles form a boundary layer between the electrodes and the separators, which is, however, permeable to the zinc chloride dissolved in water.

The stack of layers 116 comprises electrical conductors 103 and 104, which comprise layers 103*a* and 104*a* of carbon particles that protect them from contact with the electrolyte. Positive electrode 108*d* is deposited directly on layer 104*a*, and negative electrode 107*d* is deposited directly on layer 103*a*. Between electrodes 107*d* and 108*d* is separator 117*d*, which is framed by electrolyte layers 111*g* and 111*h*. Since the electrolyte layers 111*g* and 111*h* help to electrically isolate the positive electrode 108*d* and the negative electrode 107*d* from each other due to their content of electrically non-conductive mineral components, they can be regarded as components of the separator 117*d*. In any case, the mineral particles form a boundary layer between the electrodes and the separators, which is, however, permeable to the zinc chloride dissolved in water.

The first conductor 101 and the third conductor 103 are disposed in distance from each other on a surface of the first substrate 109*a* facing the second substrate 109*b*, while the second conductor 102, the fourth conductor 104 and the fifth conductor 105 are disposed in distance to each from each other on a surface of the second substrate 109*b* facing the first substrate 109*a*.

The four individual cells 113, 114, 115 and 116 are electrically connected in series so that their voltages add up. For this purpose, electrodes of opposite polarity of the single cells are electrically connected via the first conductor 101, the second conductor 102 and the third conductor 103. The conductors electrodes have opposite polarity, and the first conductor is electrically in contact with an electrode of the fourth single cell, wherein the electrodes electrically connected by this conductor also have opposite polarity. As noted above, regions of conductors 104 and 105 not covered by electrode material may serve as terminals of battery 100 to tap the added voltage of its four serially connected individual cells 113-116.

Since the individual cells 113-116 described herein are based on zinc-manganese dioxide as an electrochemical system, each of the cells provides a nominal voltage of about 1.5 volts. The battery 100 is therefore capable of providing a nominal voltage of about 6 volts.

As a result of the aforementioned wrapping and final welding and/or bonding along the line 117, the battery 110 has a closed housing 118 in which the stacks of layers 113 to 116 are arranged. The regions of the conductors 104 and 105 not covered by electrode material can be led out of the housing so that the voltage of the battery 100 can be tapped from the outside.

For the impedance properties of the battery 100, it is important that the layer-shaped components of the individual cells 113-116, which are in direct contact within the stack of layers, have contact with each other over as large an area as possible. This is explained with reference to cell 113.

First, in order to optimize impedance, it is necessary to provide contact between electrodes 107*a* and 108*a* and electrical conductors 101 and 105 over as large an area as possible. As explained above, conductors 101 and 105 form continuous electrically conductive surfaces on substrates 109*a* and 109*b*, respectively, as shown in FIGS. 1A and 1B. The electrically conductive surface formed by the conductor 101 and the electrode 108*a* deposited thereon approximately overlap in the direction of view perpendicular to the electrode 108*a* and the conductor 101 in an overlay region in which a straight line perpendicular to the electrode 108*a* intersects both the electrode and the conductor 101. In the specific case, this overlay region is exactly the area of the electrode 108*a*. Thus, the electrode 108*a* is in contact with the electrical conductor 101 over its entire surface. In the case of the contact between the electrode 107*a* and the conductor 105, the same applies analogously. Here, too, there is full-surface contact.

Furthermore, the connection of the electrodes 107*a* and 108*a* to the separator 117*a* is of importance. As explained above, the separator 117*a* is in contact with the electrodes 107*a* and 108*a* via the electrolyte layers 111*a* and 111*b* or the boundary layers formed from the mineral particles, wherein in the present example the electrolyte or boundary layers 111*a* and 111*b* can be regarded as part of the separator 117*a*. One side of the separator has a first contact surface to the positive electrode 108*a*, the other side parallel thereto has a second contact surface to the negative electrode 107*a*. Preferably, the contact surfaces overlap each other in the direction of view perpendicular to the separator in an overlay region defined by a straight line perpendicular to the separator intersecting both contact surfaces.

Since the electrodes 107*a* and 108*a* have identical surface dimensions and are not offset from one another within the stack, the size of this overlay area corresponds exactly to the size of the electrodes 107*a* and 108*a*. The electrodes 107*a* and 108*a* are thus not only in full-surface contact with the conductors 101 and 105, but also with the separator or the electrolyte layers 111*a* and 111*b* of the separator.

Figure 3:
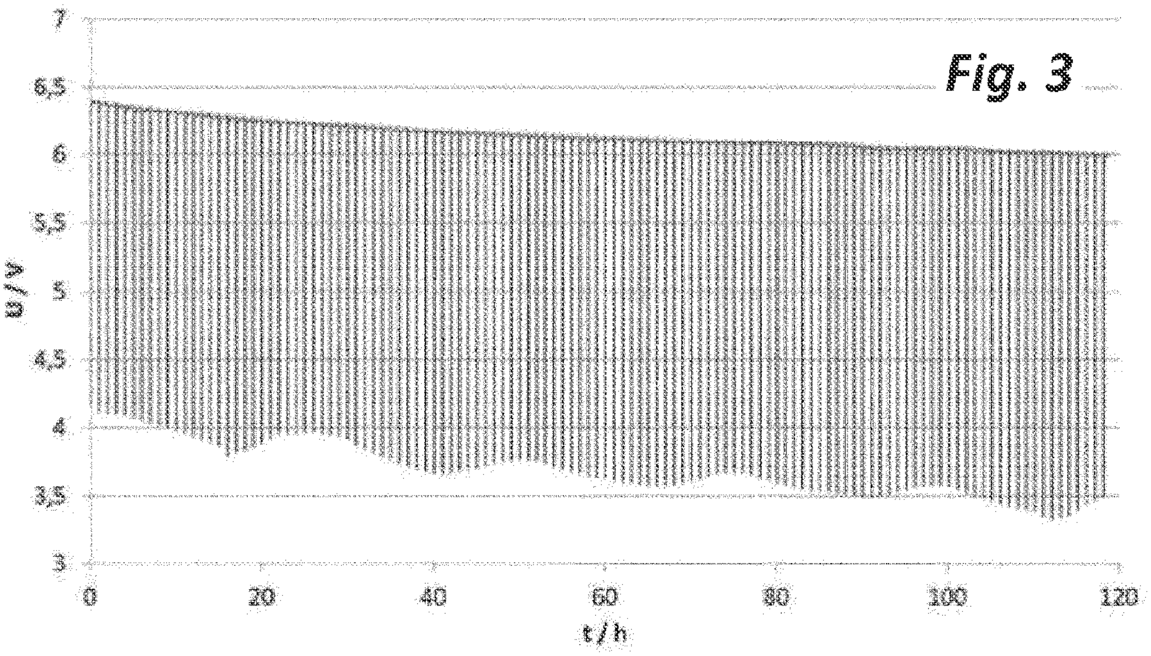
FIG. 3 illustrates the result of a pulse test with a battery according to an embodiment.

The results of a pulse test shown in FIG. 3 were carried out with a battery comprising four individual cells connected electrically in series and designed according to FIG. 2. The electrodes of the four cells each extended over an area of approximately 22 $cm^2$ on the respective substrates. The individual cells were electrically connected in series and supplied a nominal voltage of 6 V. In fact, the open-circuit voltage was about 6.4 volts, and the final discharge voltage was about 3.1 volts. Prior to measurement, the battery was stored at 45° for a period of one month to artificially simulate aging. Nevertheless, the battery delivered a total of 118 TX pulses. A fresh battery delivered more than 400 Tx pulses in a load test and is thus ideally suited to power an LTE chip.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of manufacturing a zinc-manganese dioxide cell, the method comprising:

applying a first electrical conductor to an electrically non-conductive substrate and applying a second electrical conductor to the electrically non-conductive substrate;

applying a layer-shaped negative electrode directly onto the first electrical conductor and applying a layer-shaped positive electrode directly onto the second electrical conductor;

providing a layer-shaped separator;

applying at least one electrolyte layer to the layer-shaped negative electrode and/or to the layer-shaped positive electrode and/or to the layer-shaped separator; and forming a stack of layers with the sequence negative electrode/separator/positive electrode;

wherein the negative electrode is formed of a paste comprising zinc powder (mercury free), electrode binder, and solvent and/or dispersant, wherein the positive electrode is formed of a paste comprising manganese dioxide, conductive material for improving electrical conductivity, electrode binder, and solvent and/or dispersant, wherein the at least one electrolyte layer is formed of a paste comprising at least one water-soluble, chloride-containing salt, mineral particles, and solvent and/or dispersant, the proportion of the mineral particles in the paste being in a range of 5% by weight to 60% by weight.

2. The method of claim 1, wherein at least one of:

the separator is a porous plastic film or a porous nonwoven, the separator has a thickness in a range of 60 to 120 μm, the separator has a porosity in a range of 35% to 60%, and/or the separator comprises a polyolefin.

3. The method according to claim 1, wherein at least one of:

the mineral particles are selected from the group consisting of: ceramic particles, salt particles that are nearly or completely insoluble in water, glass particles, and particles of natural minerals and stones, $CaCO_3$ particles are used as the mineral particles, the mineral particles have a d50 value in a range of 0.8 μm to 40 μm, the paste for producing the at least one electrolyte layer is essentially free of mineral particles with a particle size >80 μm, the paste for producing the at least one electrolyte layer comprises at least one additive, an additive to adjust viscosity, the paste for preparing the at least one electrolyte layer comprises a mineral powder with a mean particle size (d50) <500 nm, water is used as the solvent and/or dispersant, a proportion of the at least one water-soluble chloride-containing salt in the paste is at least 25% by weight and at most 50% by weight, and/or a paste for producing the at least one electrolyte layer comprises the following components, the proportions of the components of the paste adding up to 100% by weight:

the at least one water-soluble chloride-containing salt in a proportion of 30-40 wt. %, an additive for viscosity adjustment in a proportion of 2-4 wt. %, mineral particles in a proportion of 10-30 wt. %, solvent and/or dispersant in a proportion of 40-55 wt. %, and the proportions of the components of the paste adding up to 100% by weight.

4. The method according to claim 1, wherein at least one of:

the paste for the preparation of the negative electrode comprises the zinc powder in a proportion of at least 50% by weight, the zinc powder has a $d_{50}$ value in a range of 20 μm to 40 μm, the paste for producing the negative electrode comprises at least one additive, the paste comprises carboxymethyl cellulose as an additive to adjust viscosity, the paste for making the negative electrode comprises the electrode binder in a range of at least 1 wt % to 10 wt %, the paste for producing the negative electrode comprises an electrode binder with elastic properties, water is used as solvent and/or dispersant, and/or the paste for making the negative electrode comprises the following components, the proportions of the components of the paste adding up to 100% by weight:

zinc powder (mercury-free) in a proportion of 65-79 wt. %, an additive for viscosity adjustment in a proportion of 1-5 wt. %, an elastic binder in a proportion of 5-10 wt. %, and solvent and/or dispersant in a proportion of 15-20 wt. %.

5. The method according to claim 1, wherein at least one of:

the paste for the preparation of the positive electrode comprises the manganese dioxide in a proportion of at least 50 wt %, the manganese dioxide is present in particulate form and has a d50 value in a range of 20 μm to 50 μm, the paste for producing the positive electrode comprises at least one additive, the paste comprises carboxymethyl cellulose as an additive to adjust viscosity, the paste for the preparation of the positive electrode comprises the electrode binder in a range of 5 wt. % to 15 wt. %, the paste for producing the positive electrode comprises an electrode binder with elastic properties, the paste for making the positive electrode comprises the conductive material in a proportion of 5 wt % to 35 wt %, the positive electrode fabrication paste comprises, as a conductive material, at least one conductive material selected from the group consisting of: activated carbon, activated carbon fiber, carbide-derived carbon, carbon aerogel, graphite, graphene, and carbon nanotubes (CNTs), water is used as solvent and/or dispersant, and/or the paste for making the positive electrode comprises the following components the proportions of the components adding up to 100% by weight:

manganese dioxide in a proportion of 50-70 wt. %, a conductive material in a proportion of 3-30 wt. %, an additive for viscosity adjustment in a proportion of 2-8 wt. %, an elastic electrode binder in a proportion of 8-15% by wt. %, and solvent and/or dispersant in a proportion of 20-30 wt. %.

6. The method according to claim 1, wherein at least one of:

the electrodes and the at least one electrolyte layer are formed by a printing process, the negative electrode is formed with an average thickness in a range of 30 μm to 150 μm, the positive electrode is formed with an average thickness in a range of 13 μm to 350 μm, the at least one electrolyte layer is formed with an average thickness in a range of 10 to 100 μm, the at least one electrolyte layer is applied to the negative and/or the positive electrode while it is still at least wet, and/or the separator is placed on one of the electrolyte layers formed while it is still at least wet.

7. A set for the production of a zinc-manganese dioxide cell, the set comprising:

a paste for making a negative electrode, the paste comprising: zinc powder (mercury free), electrode binder, and solvent and/or dispersant;

a paste for making a positive electrode, the paste comprising: manganese dioxide, a conductive material to improve electrical conductivity, an electrode binder, a solvent and/or dispersant; and a paste for preparing an electrolyte layer, the paste comprising: at least one water-soluble chloride-containing salt, mineral particles, and solvent and/or dispersant.

8. The set according to claim 7, further comprising a separator for a zinc-manganese dioxide cell, wherein the separator:

is a porous plastic film or a porous nonwoven, has a thickness in a range of 60 to 120 μm, has a porosity in a range of 35% to 60%, and
comprises a polyolefin.

9. A zinc-manganese dioxide cell, comprising:
a first electrical conductor disposed on an electrically non-conductive substrate;
a second electrical conductor disposed on the electrically non-conductive substrate;
a layer-shaped negative electrode disposed directly on the first electrical conductor;
a layer-shaped positive electrode disposed directly on the second electrical conductor; and
a layer-shaped separator,
wherein the electrodes and the separator are in the form of a stack of layers with the sequence negative electrode/separator/positive electrode, in which the negative electrode and the separator as well as the positive electrode and the separator are each connected to one another via an interface;
wherein the electrodes and the separator are soaked with a chloride solution, preferably with a zinc chloride solution and/or an ammonium chloride solution, and
wherein the interfaces between the electrodes and the separator include mineral particles that form a boundary layer permeable to an electrolyte.

10. The zinc-manganese dioxide cell according to claim 9, wherein at least one of:
the negative electrode of the cell comprises the following components:
zinc powder (mercury-free) in a proportion of 81 to 93 wt. %,
an additive for viscosity adjustment in a proportion of 1 to 7 wt. %, and
an electrode binder in a proportion of 6 to 13 wt. %;
the positive electrode of the cell comprises the following components:
manganese dioxide in a proportion of 62-82 wt. %,
conductive material in a proportion of 5-35 wt. %,
an additive for viscosity adjustment in a proportion of 2-10% wt. %, and
an electrode binder in a proportion of 6-13 wt. %.

11. The zinc-manganese dioxide cell according to claim 9, wherein at least one of:
the mineral particles are selected from the group consisting of: ceramic particles, salt particles that are nearly or completely insoluble in water, glass particles, and particles of natural minerals and stones,
$CaCO_3$ particles are used as mineral particles,
the mineral particles have a d50 value in a range of 0.8 μm to 40 μm, and
the boundary layer comprises mineral particles with a mean particle size ($d_{50}$) <500 nm.

12. The method according to claim 1, wherein the layer-shaped separator is a sheet-like separator in the form of a porous polymer film or a porous nonwoven.

13. The method according to claim 1, wherein the at least one electrolyte layer comprises a first electrolyte layer and a second electrolyte layer, and
wherein the stack of layers has the sequence negative electrode/first electrolyte paste layer/separator/second electrolyte paste layer/positive electrode.

14. The zinc-manganese dioxide cell according to claim 9, wherein the layer-shaped separator is a sheet-like separator in the form of a porous polymer film or a porous nonwoven.

15. The zinc-manganese dioxide cell according to claim 9, further comprising:
a first interfacial boundary layer disposed between the layer-shaped separator and the layer-shaped negative electrode;
a second interfacial boundary layer disposed between the layer-shaped separator and the layer-shaped positive electrode,
wherein the stack of layers has the sequence negative electrode/first interfacial boundary layer/separator/second interfacial boundary layer/positive electrode.

16. The zinc-manganese dioxide cell according to claim 15, wherein the first interfacial boundary layer includes a first portion of the mineral particles and the second interfacial boundary layer includes a second portion of the mineral particles.

17. The zinc-manganese dioxide cell according to claim 15, wherein the first interfacial boundary layer and the separator form a first pore gradient, and wherein the second interfacial boundary layer and the separator form a second pore gradient.

* * * * *